Dec. 29, 1931.  H. A. VOLTZ  1,838,798
AUTOMATIC STILL PICTURE CAMERA
Filed July 31, 1928   4 Sheets-Sheet 1
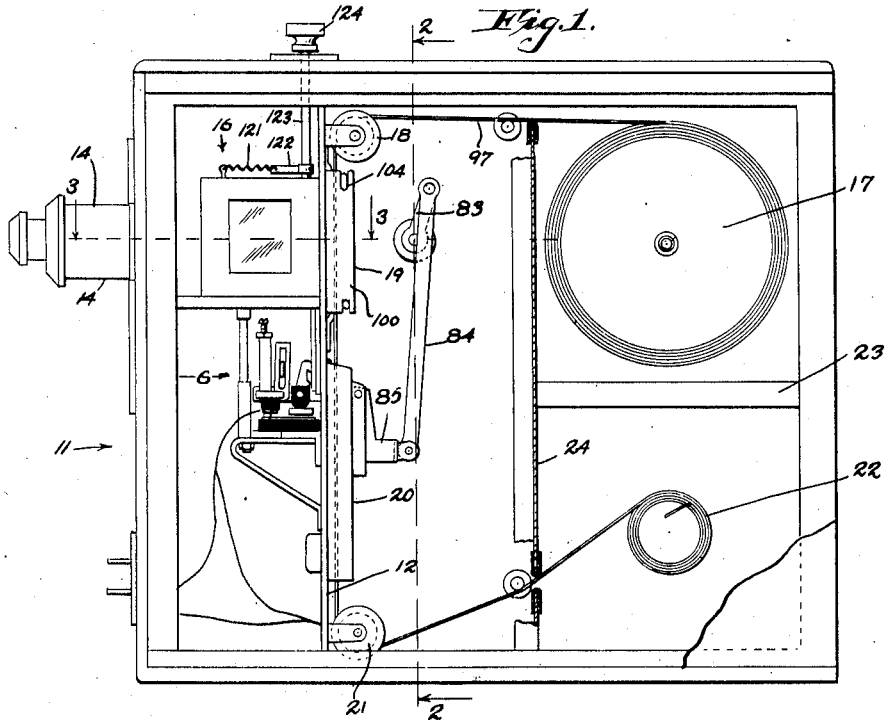
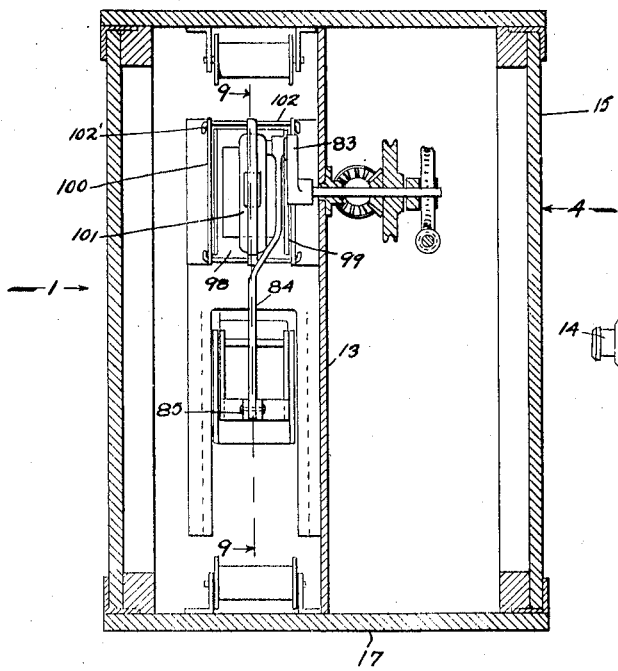
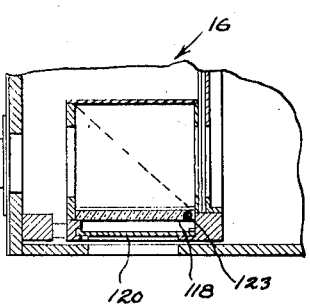
Inventor
H. A. Voltz
By Hazard and Miller
Attorneys Dec. 29, 1931.   H. A. VOLTZ   1,838,798
AUTOMATIC STILL PICTURE CAMERA
Filed July 31, 1928   4 Sheets-Sheet 2

Inventor
H. A. Voltz
by Hazard and Miller
Attorneys

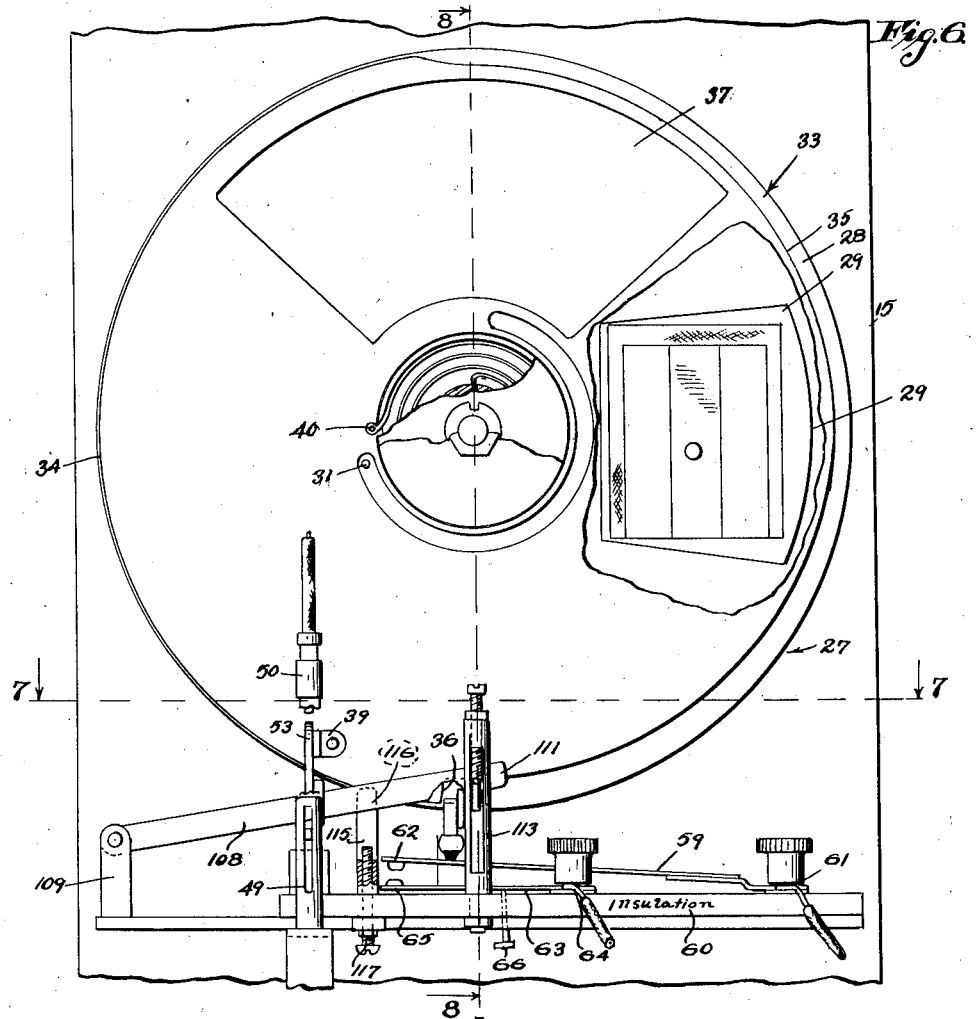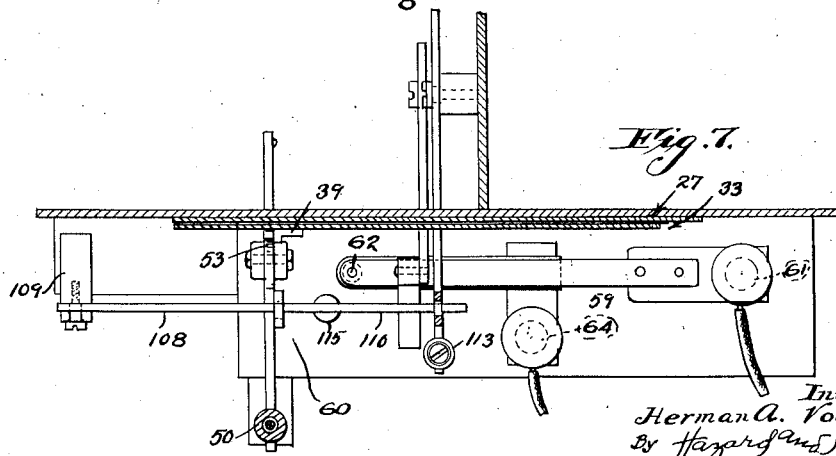

Dec. 29, 1931.   H. A. VOLTZ   1,838,798
AUTOMATIC STILL PICTURE CAMERA
Filed July 31, 1928   4 Sheets-Sheet 4

Inventor
H. A. Voltz
By Hazard and Miller
Attorneys.

Patented Dec. 29, 1931

1,838,798

UNITED STATES PATENT OFFICE

HERMAN A. VOLTZ, OF DEL ROSA, CALIFORNIA, ASSIGNOR OF ONE-HALF TO JOSEPH H. CONNORS, OF LOS ANGELES, CALIFORNIA

AUTOMATIC STILL PICTURE CAMERA

Application filed July 31, 1928. Serial No. 296,509.

My invention is an automatic still picture camera.

An object of my invention is the construction of a camera for automatically taking still pictures in contradistinction to moving pictures; and in which the operator has control of each exposure, the shutter operating under his control, the film being shifted automatically, and the shutter mechanism rewound and repositioned for subsequent exposures. In this regard a further object of my invention is the construction of a camera to take automatic still pictures, in which the photography of each picture is under the control of an operator who may, with my mechanism, take pictures as rapidly as the shutter can operate and the film be wound for subsequent exposures.

Another object of my invention is the construction of a camera which is electrically operated to set the shutter and wind the film; and in which the shutter is actuated in taking the exposure by a spring motor, the shutter mechanism and the motor being controlled by an operator for each exposure. And in this connection a more detailed object is whereby on the release of the shutter by the operator the shutter automatically moves to make an exposure and, at the same time, an electric circuit is established whereby the motor shifts the shutter to its initial position and rewinds the shutter mechanism, and also actuates a winding reel and a film moving device to shift the film a sufficient amount for a subsequent exposure. As regards the control of the camera by the operator, I have this arranged so that this may be done by a distant control such as by a long Bowden wire or the like.

As regards the shutter mechanism, a detail object of my invention is the construction of a shutter cooperating with a resetting device whereby the shutter is released by the operator and moves under the influence of a spring, the tension of the spring being variable to give different speeds of exposure; and after the exposure has been completely made the movement of the shutter closes an electric circuit, this circuit energizing the motor and the motor moving the resetting mechanism which resets the shutter in its initial position and winds the shutter spring. The motor, as above mentioned, also operates the reel and the film moving device.

A field of usefulness of my invention is in taking studio portraits, in which it has been found that many people are self conscious when posing before the camera, assuming an unnatural expression or attitude. With my construction the photographer does not need to be near the camera and may converse with the subject, the subject being in the proper position to register on the film, and unknown to the subject the photographer may take one picture after the other in rapid succession without the subject being aware that such photographs are being made. Another field of usefulness is for installing cameras in positions to automatically photograph persons engaged in theft or other unlawful proceedings, unknown to such parties.

My invention will be more readily understood from the following description and drawings, in which:

Fig. 1 is a side elevation with the side open of my camera, taken in the direction of the arrow 1 of Fig. 2, Fig. 2 is a transverse section on the line 2—2 of Fig. 1 in the direction of the arrow.

Fig. 3 is a horizontal section on the line 3—3 of Fig. 1 through the finder,

Figure 4:
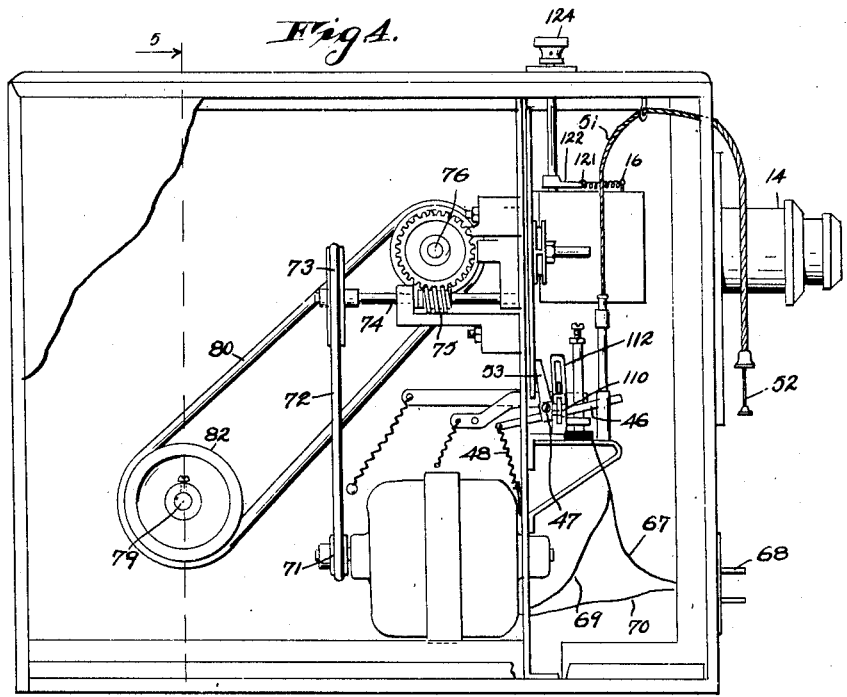
Figure 5:
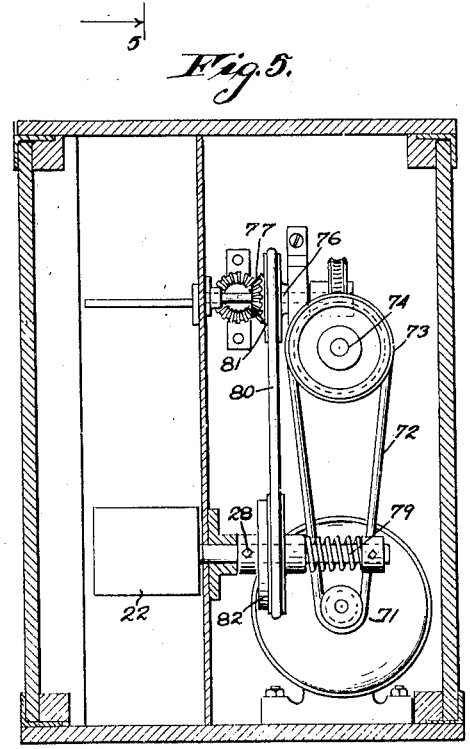
Figure 10:
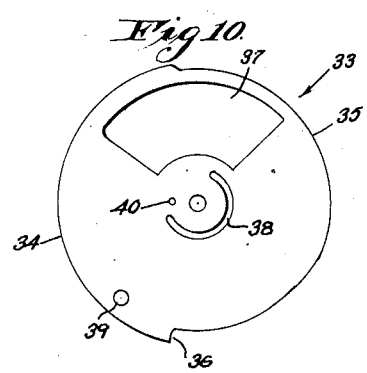
Figure 11:
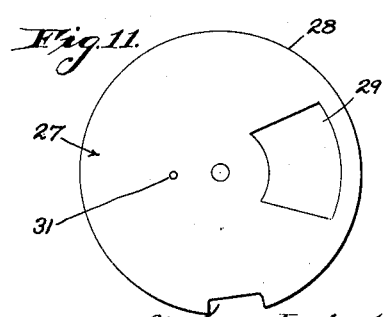
Figure 9:
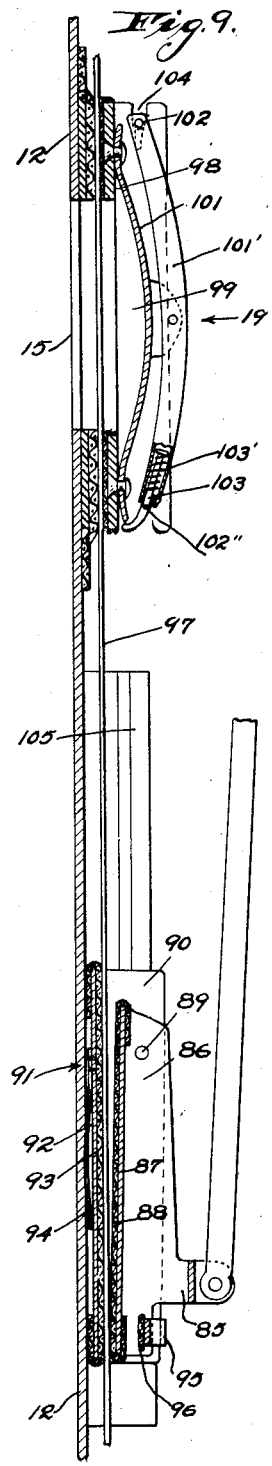
Figure 8:
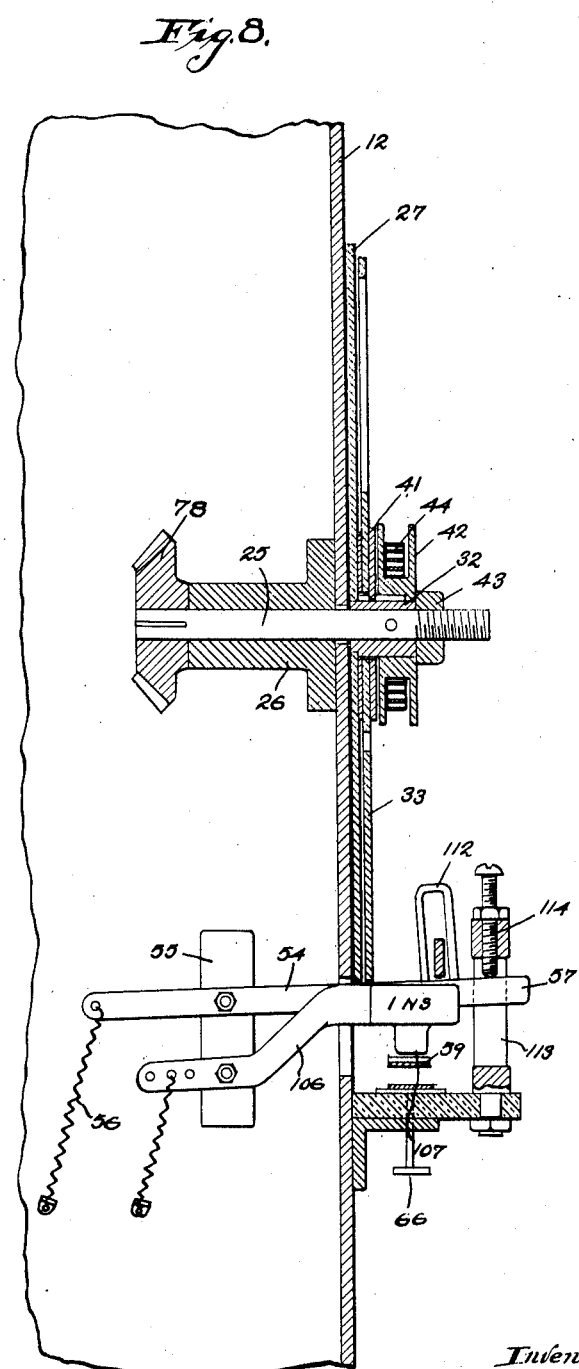

Fig. 4 is a side elevation, with the side broken away, opposite that of Fig. 1, and in the direction of the arrow 4 of Fig. 2, Fig. 5 is a vertical transverse section on the line 5—5 of Fig. 4 in the direction of the arrow, Fig. 6 is an enlarged front elevation of the shutter and the control mechanism therefor, taken in the direction of the arrow 6 of Fig. 1, Fig. 7 is a horizontal section on the line 7—7 of Fig. 6 in the direction of the arrow, Fig. 8 is a vertical longitudinal section on the line 8—8 of Fig. 6 in the direction of the arrow, Fig. 9 is a vertical longitudinal section on the line 9—9 of Fig. 2 in the direction of the arrow, showing in detail the supporting back for the film and the film moving device, Fig. 10 is a front elevation of the shutter, Fig. 11 is a front elevation of the control disc mounted behind the shutter.

In the general construction of my camera I provide a box-like structure designated generally by the numeral 11. This has a transverse partition 12 positioned adjacent the front and a longitudinal partition 13 extending rearwardly from the partition 12 to the back wall. The lens 14 is positioned on one side of the camera so that the light from the lens passes through an opening 15 in the partition 12, there being a finder designated generally by the numeral 16 positioned forward of the partition 12 and of a shiftable type to be moved out of the line of vision of the lens. A film spool 17 is located on one side of the partition 13 and the film passes over idler rollers 18 downwardly behind the partition 12, being supported by a supporting back 19 behind the opening 15 in the position in which the photograph is taken. A film shifting or moving device 20 is positioned behind the partition 12 and shifts the film after each exposure as hereunder described, the film passing under an idler roller 21 and being wound on a reel 22, this reel being driven as hereunder set forth.

A horizontal partition 23 separates the spool from the reel and a vertical partition 24 together with one side of the camera, the center partition 13, and the partition 23 form compartments for the unexposed and exposed film. The opposite side of the partition 13 and the side of the camera form a compartment for the operating motor and the gear train actuated thereby as hereunder set forth.

The shutter mechanism is substantially as follows, having reference particularly to Figs. 4, 6, 7, 8, 10 and 11: A shaft 25 is mounted in a suitable journal bracket 26 on the back of the partition 12, this shaft extending forwardly thereof and having a shutter resetting disc 27 mounted thereon. This disc is illustrated in detail in Fig. 11 and has a circular periphery 28 and a large opening 29 through one portion, to be normally located in front of the opening 15 in the partiton 12 as hereunder detailed. The disc also has a notch 30 in its periphery to be engaged by a trigger type device released by a cam. There is also a pin 31 extending outwardly from the face of the disc 27.

Mounted on the shaft 25 forward of the partition 12 there is a bushing 32, and loosely rotatable thereon I mount the shutter disc 33. This disc is illustrated in detail in Fig. 10 and has a portion of its periphery 34 concentric with the center and with a cam surface 35 terminating in a shoulder 36. There is a large arcuate opening 37 to make the exposure, an arcuate slot 38 through which the pin 31 on the disc 27 extends, and a stop nub 39 positoned adjacent the circular peripheral section 34. A spring engaging pin 40 is also located on the shutter disc.

A washer 41 is positioned between the shutter disc and a spring supporting hub 42, this hub being keyed or otherwise secured to the bushing 32 and rotates with the shaft 25, such hub being held in place by an adjusting nut 43. A coil spring 44 has one end secured to the hub 42 and the other end engaging the pin 40 on the shutter disc. This spring is normally designed to rotate the shutter at the desired speed for the exposure; and the rate of operation may be governed by removing the nut 43 and shifting the hub 42 on the bushing 32, thus increasing or decreasing the tension of the spring 44.

The shutter release mechanism comprises the following structure: A shelf 45 is suitably supported on the front of the transverse partition 12 and carries a rock lever 46 journaled on a pin 47 extending transversely in front of the partition 12. This lever extends through the partition 12 and has a spring 48 on the rearward end normally tilting the lever upwardly. The outer end of the lever travels vertically in a slotted post 49. The upper end 50 of this post is illustrated as tubular and has a flexible Bowden wire 51 connected thereto so that by pressing in on the finger end 52 of such wire the outer end of the rock lever 46 is depressed.

The rock lever has a trip arm 53 rigidly connected thereto and extending upwardly, this being normally in the position illustrated in Fig. 4 and due to the tension of the spring 48 engages the stop nub 39 on the shutter disc 33. This normally holds the shutter in the position illustrated in Fig. 6 with the exposure opening 37 in a position closely contiguous to the opening 15 in the partition 12 and the opening 29 in the resetting disc 27 when this is in its position for exposure of the film. Therefore, when the Bowden wire is operated and the rock lever 46 oscillated the trip arm 53 is disengaged from the nub 39, releasing the shutter and allowing its rotation under the influence of the shutter actuating spring.

The shutter resetting disc 27 is held stationary by means of a trigger lever 54 which is pivotally mounted on a bracket 55 secured to the longitudinal partition 13 in the rear of the partition 12. This lever is under the tension of a spring 56 at its rear end which normally tilts the forward end 57 upwardly; and such end engages in the notch 30 of the disc 27, thus holding this disc in its normal stationary position.

When the trigger lever 54 is depressed in the manner hereunder set forth it disengages from the notch 30 of the disc 27. There is a conducting spring 59 which is downwardly pressed and as hereunder described, this spring being mounted on an insulating plate 60 on the shelf 45. One end of this conducting spring is connected to a terminal 61 and the other end has a moving contact 62. A cooperating conductor strip 63 is mounted on the insulating plate 60 and connected to a terminal 64. This has a contact 65 to engage with the contact 62. This conductor strip may be thrust upwardly by an adjusting screw 66 extending through the plate 60. These contacts 62 and 65 form in effect a switch energizing the electric motor when the spring contact 59 is depressed. Wire 67 is illustrated as connected to one of the terminals and to a plug 68 on one side of the cabinet, there being a lead 69 from the other terminal to the motor, and a lead 70 from the motor to the plug 68.

The drive from the motor is by a pulley 71 on the motor shaft and a plain belt 72 to a pulley 73 on a worm shaft 74, this having a worm 75 operating a transverse shaft 76. This transverse shaft has a beveled gear 77 operating a beveled gear 78 on the shaft 25, the shaft 25, as above mentioned, having the resetting disc 27 rigidly connected thereto and driving such disc so that this disc is given a complete rotation by the motor until the notch 30 is again in alignment with the trigger lever 54, whence this lever springs upwardly under the tension of the spring 56 and stops the rotation of the disc 27 prior to which the motor is deenergized. This rotating action of the resetting disc is subsequent to the exposure made by the shutter as hereunder described.

The reeling mechanism comprises a reel shaft 79 suitably journaled in the longitudinal partition 13 and driven by a belt 80 taking power from a pulley 81 on the shaft 76 and driving a pulley 82 on the shaft 79. The reel 22 is connected to the reel shaft and is on the opposite side of the partition from the motor and the drive as above described.

The film feed is substantially as follows, having reference particularly to Figs. 1, 2, 4, 5 and 9:

The shaft 76 extends through the partition 13 and has a crank 83 connected thereto, and to this crank there is attached a link 84. This link is attached to a bracket 85 attached to the sides 86 of a feeder plate 87. This plate is covered with chamois 88. The sides 86 are mounted on a pivot bolt 89 which is mounted on the side plates 90 of a carrier frame 91 having a back plate 92 covered with chamois 93.

A flat leaf spring 94 is positioned back of the plate 92 and bears against the partition 12. A cross bar 95 has a chamois buffer 96 mounted thereon to limit the outward movement of the lower end of the feeder plate 87.

The film 97, as above mentioned, is fed from the spool 17 over the idler pulley 18 and passes behind the supporting back 19 downwardly between the plates 87 and 92, the chamois engaging on opposite sides of the film, and thence over the idler 21 of the reel 22.

The back plate 19 has a flat plate 98 with lateral flanges 99 fitting between the side plates 100 on the partition 12, these side plates being at opposite sides of the opening 15. A spring 101 is mounted on the plate 98 and has a rod 101' pivotally mounted thereon, this having an upper cross arm 102 with hooks 102' thereon. A rod 103 inwardly drawn by a spring 103' has a cross arm 102''. These cross arms 102 and 102'' engage in the notches 104 in the side plates 100. The tension of the springs 101 and 103' hold the film in a firm position for taking the photograph, but allow the film to be drawn in a forward direction to change the exposures.

The carrier frame 91 is slidable on the guides 105 and has a straight reciprocating motion. This is caused by the crank 83 and the link 84. On the upward pull of this link the plate 87 is rocked outwardly on the pin 89 and thus allows the film to remain stationary while the carrier frame is elevated. On the downward movement, however, of the link 84 the chamois 88 of the plate 87 is thrust against the back of the film and grips this film between the chamois 93 on the plate 92, thus carrying the film downwardly in the downward movement of the carrier frame. The movement of the carrier frame is sufficient to shift the film from one photographic position to another, and at the same time the motor operates the reel to wind in the film.

The electric switch control operating the motor is by means of a switch operating lever 106 preferably pivotally mounted on the bracket 55 and extending through an opening in the partition 12. This lever has a nub 107 on its under edge positioned to engage the top of the spring 57. This lever normally rests on the spring and is of insufficient weight to engage the contacts 62 and 65. However, when the shutter has been released in the manner above described by actuation of the rock lever 46, the spring 44 rotates this shutter until the cam portion 34 strikes the top of the switch actuating lever. The cam therefore depresses this lever so that the contacts 62 and 65 engage and thus establish the electric circuit. At substantially the same time that the shutter is brought to rest by engagement of the stop nub 39 and the trip arm 53, the portion of the shutter to the right of the shoulder 36, as viewed in Figs. 5 and 10, is in position to accommodate the trigger lever 54 in its upper position and also the switch actuating lever 106 in its upper position.

The interconnection of the shutter release by the rocking lever 46 and the trigger 54 is by means of an interconnecting lever 108 pivotally mounted on a bracket 109 mounted on the shelf 45. This lever rests on top of the rock lever 46, fitting in a yoke 110 thereon; and also having its outer end 111 passing through a yoke 112 on the trigger lever 54. This yoke is to prevent too great an upward movement of the lever 108. A tube 113 having a slot therethrough accommodates the outer end of the trigger lever 54 and this has an adjustable screw 114 to engage the top of such lever. There is also a stud 115 mounted on the insulating plate 60 and having a kerf 116 in its upper end in which the interconnecting lever 108 has a vertical sliding motion. An adjusting screw 117 extends upwardly into this kerf to engage the lower edge of the lever 108 and thus regulates the amount of depression of such lever.

When the shutter is released by the downward movement of the rock lever 46 the interconnecting lever 108 depresses the trigger lever 54 so that this latter lever is moved downwardly in the slot 30, but still retains the resetting disc 27 from movement. In this action the switch actuating lever 106 is left unmoved, being supported by the spring conducting arm 59 with the contacts 62 and 65 out of engagement.

The spring 44 interacts between the resetting disc 27 and the shutter 33 so that the shutter is actuated to make the exposure and be rotated with considerable force. The cam section 34 strikes the upper edge of the trigger lever 54 and immediately thereafter the upper edge of the switch actuating lever 106. This action depresses both of these levers until they are absolutely clear of the notch 30 in the resetting disc. The cam forces the nub 107 on the switch operating lever 106 downwardly with sufficient force to engage the contacts 62 and 65 which energizes the electric motor and causes the rotation of the resetting disc 27. The peripheral portion 34 of the cam section of the shutter should be equal to or of slightly greater radius than the distance from the center of the resetting disc to its periphery 28 so that the switch operating lever 106 will be maintained in contact with the spring contacting arm 58 until the motor should be deenergized; and in this action, as above mentioned, the pin 31 on the resetting disc operates in the slot 38 in the shutter to rotate the shutter.

The motor when energized rotates the resetting disc, and the pin 31 on this disc moves in the arcuate slot 38, this slot being of sufficient length so that the shutter may operate to make the exposure without any interference; and the pin carries the shutter around until the trigger lever 54 and the switch actuating lever 106 may spring upwardly into the notch 30. This notch is made of a considerable length so that the motor is deenergized and there is still a slight motion preventing an abrupt stoppage of the motor through the medium of the resetting disc and the gear train. This action of the resetting disc rotating the shutter winds the spring 44 so that the shutter is under tension for the next exposure. If for any reason the electric circuit does not appear to operate, the operator may manually actuate the switch lever 106 by opening the front of the camera and reaching inside.

The finder designated generally by the numeral 16 is constructed substantially as follows, having reference particularly to Figs. 1 and 3: A pivotally mounted mirror 118 is mounted so that it may occupy either the full-line position or the dotted-line position shown in Fig. 3; and in the dotted line position it reflects the light from the lens 119 through the ground glass 120. The mirror is normally under the tension of a spring 121 connected to an arm 122 on a vertical shaft 123 which forms the hinge of the mirror and extends upwardly to an operating head 124 on the top of the camera box. Thus when it is desired to focus the camera the operator turns the head 124 and views the scene focused on the ground glass; and when it is desired to take the photograph he releases the head 124 and the mirror is then swung to the position of Fig. 3 allowing exposure of the film.

It will therefore be seen by my construction that I have developed an automatic still picture camera in which the operator may, if desired, be positioned at a considerable distance from the camera; and he may, in fact, walk around the studio, more or less, and have the subject to be photographed in the proper focus of the camera and when the subject has lost self consciousness or is composed to take a good photograph the operator may start the actuation of the device either by a Bowden wire or other suitable connection unknown to the subject. The mechanism of the camera then operates the shutter to automatically make the exposure, and the electric motor is automatically energized causing the shutter to be repositioned and the spring motor retensioned for the next exposure, and also the film is shifted in the position for the next exposure. It will thus be seen that by my mechanism photographs may be taken substantially as rapidly as the shutter can be operated, reset and the film rewound. Thus a photographer may make a large number of exposures in a comparatively short time.

The feature of having the interconnecting arm 108 depress the trigger lever partly makes the operation such that the cam portion of the shutter is only required to thrust this lever downwardly a comparatively slight distance; and as the switch actuating lever 106 is comparatively light there is not a great deal of force required. Therefore, the energy of the spring and the kinetic energy of the moving shutter are sufficient to release the resetting disc and close the switch for energizing the motor.

I claim:—

1. In a camera, the combination of a shutter, an urging means to move the shutter, a restraining means for the shutter, means to release the restraining means, whereby the shutter may be moved to make an exposure, a resetting device for the shutter, means controlled by the operation of the shutter to start the movement of the resetting means, and means initiated by the movement of the shutter to control the shifting of the film for a fresh exposure.

2. In a camera, the combination of a shutter, a spring to move the shutter for an exposure, a restraining means for the shutter, means to release the restraining means and allow complete movement of the shutter under the action of the spring, to make an exposure, a motor, a control means for the motor operated by the shutter in its movement, means operated by the motor to reset the shutter, and means operated by the motor to shift the film.

3. In a camera, the combination of a shutter, a spring to move the shutter to make an exposure, a restraining means for the shutter, means to release the restraining means, a resetting device, a motor, a controlling means for the motor operated by the shutter to start the motor, a restraining device for the restraining means released by the movement of the shutter, and means to move a film.

4. In a camera, the combination of a shutter, a spring to move the shutter in making an exposure, means to restrain and release the shutter for an exposure, an electric motor, a circuit for the motor having a switch, means to close said switch actuated by the shutter, means operated by the motor after a complete movement of the shutter to reset the shutter and to rewind the spring, and means to move a film.

5. In a camera as claimed in claim 4, the means to move the film comprising a drive connection from the electric motor to the film, said drive connection moving the film substantially simultaneously with the resetting of the shutter.

6. In a camera, the combination of a rotary shutter having an opening to make an exposure, a spring to move the shutter for an exposure, a restraining and releasing means for the shutter, a motor, means operated by the shutter to initiate the operation of the motor, and a rotary resetting device operated by the motor to reset the shutter and to rewind the spring.

7. In a camera, a rotatable shaft having a resetting device rigidly connected thereto, a rotary shutter loosely rotatable on the shaft, a spring interconnected between the shaft and the shutter to move the shutter for an exposure, a restraining and releasing means for the shutter, a restraining means for the resetting device, means controlled by the movement of the shutter to release the resetting device, a circuit for the motor having a switch, said switch being closed by the release of the resetting device, the said motor rotating the said shaft and the resetting device, and means interconnecting the shutter and the resetting device to return the shutter to its initial position and to rewind the spring.

8. In a camera, the combination of a rotary shaft having a resetting disk connected thereto, a rotary shutter loosely mounted on said shaft adjacent the disk, a spring interconnected between the shutter and the shaft, a restraining and releasing device for the shutter, a restraining and releasing device for the resetting disk, means to operate the restraining and releasing device for the shutter to allow operation of the shutter, a connecting means between the restraining means for the shutter and the resetting disk, to release the resetting disk, an electric motor having a circuit with a switch, means operated by the shutter to close the switch at substantially the time of the complete movement of the shutter, said motor operating the shaft and rotating the resetting disk, an interconnection between the resetting disk and the shutter to return the shutter to the initial position and to retension the spring.

9. In a camera as claimed in claim 8, a reel adapted to receive the exposed film, and means operated by the motor to shift the film and at the same time to wind the reel to take in the exposed film, the film shifting means and the reel being independent one of the other.

10. In a camera, the combination of a rotatable shutter, a resetting device interconnected with the shutter, a spring interconnected between the resetting device and the shutter to shift the shutter for an exposure, a restraining and releasing means for the shutter, a second restraining and releasing means for the resetting device, a cam surface on the shutter to release the resetting device, an electric motor having a circuit with a switch, the said cam surface being adapted to control the closing of the switch and to start the motor after the shutter has completed its operation, and means interconnecting the motor and the resetting device to operate the resetting device to reset the shutter to rewind the spring.

11. In a camera, the combination of a rotatable shutter, a rotatable resetting device interconnected therewith, a spring interconnected between the shutter and the said device to operate the shutter for an exposure, a restraining and releasing means for the shutter, a restraining means for the resetting device, means to release the restraining means from the shutter, an interconnection between both restraining means to partly move the restraining means for the resetting device, the shutter having means to complete the release of the resetting device, and means controlled by the release of the resetting device to operate said device to reset the shutter and to rewind the spring.

12. In a camera as claimed in claim 11, a reel to receive exposed film, a film moving device operating behind an exposure gate, the means for operating the resetting device shifting the film and winding the exposed film on the reel.

13. In a camera, the combination of a rotary shutter, a rotary resetting device interconnected therewith, a spring interconnecting the shutter and the device to operate the shutter for an exposure, a first trigger restraining the shutter, a second trigger restraining the said device, an interconnecting means between said triggers to partly operate the trigger of said device on operation of a trigger of the shutter, a cam operated by the shutter to completely operate the trigger of the resetting device, and means controlled by the release of the resetting device to operate such device to reset the shutter to rewind the spring.

14. In a camera as claimed in claim 13, the means for operating the resetting device comprising an electric motor having a circuit with a switch, the switch being closed by the shutter, a rewinding reel for exposed film, a means independent thereof to shift the film, and a connection from the motor to operate the reel and to shift the film substantially simultaneously with the operation of the resetting device.

15. In a camera, a box-like construction having a lens on one side, a transverse partition in the box back of the lens, a rotatable shutter mounted on said partition, a rotatable resetting device mounted on the partition in axial alignment with the shutter, a spring interconnecting the shutter and the resetting device, a longitudinal partition connected to the transverse partition, an electric motor and a transmission therefrom on one side of the longitudinal partition, a reel and a film spool on the other side of the partition, the reel being driven from the motor, a film shifting device on the same side of the longitudinal partition as the reel and spool, a manually operable release device for the shutter, means operated by the shutter to control the starting of the motor after making an exposure, the motor having a connection to the film shifting device, and the said motor operating the resetting device to reset the shutter and wind the spring.

16. In a camera, the combination of a shutter, means to urge the shutter to make an exposure, a restraining means for the shutter, means to release the restraining means whereby the shutter may operate, a motor actuated means to retension the urging means subsequent to the complete movement of the shutter, and a second motor actuated means having mechanism operated thereby to shift a film.

17. In a camera, the combination of a shutter, a spring to operate same, a restraining means for the shutter, means to release the restraining means and, hence, allow movement of the shutter to make an exposure, a motor actuated means operated after complete movement of the shutter to retension the spring, and a second motor actuated means having mechanism connected thereto to move a film for a fresh exposure.

In testimony whereof I have signed my name to this specification.

HERMAN A. VOLTZ.